United States Patent Office 3,281,305
Patented Oct. 25, 1966

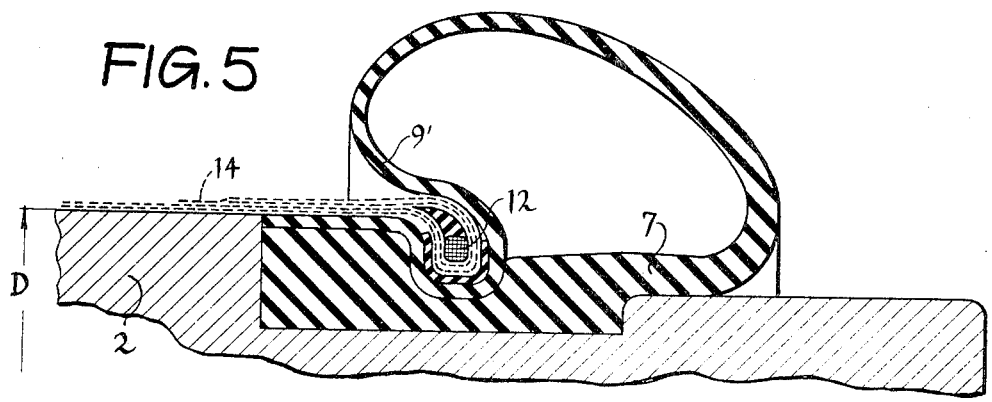
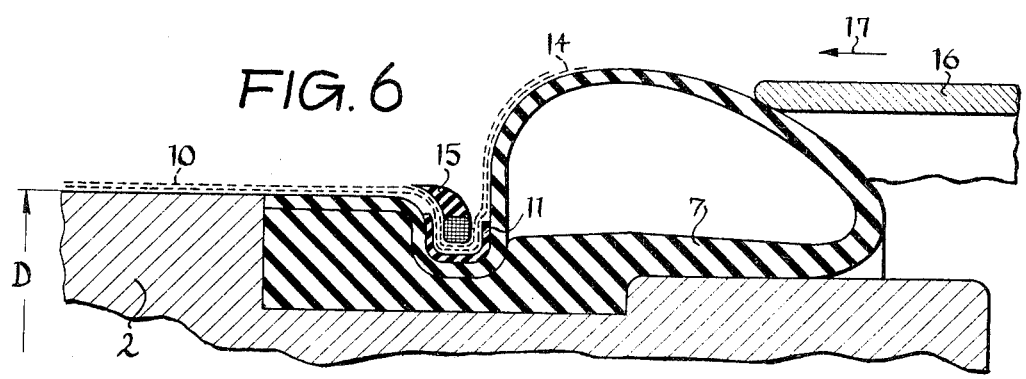
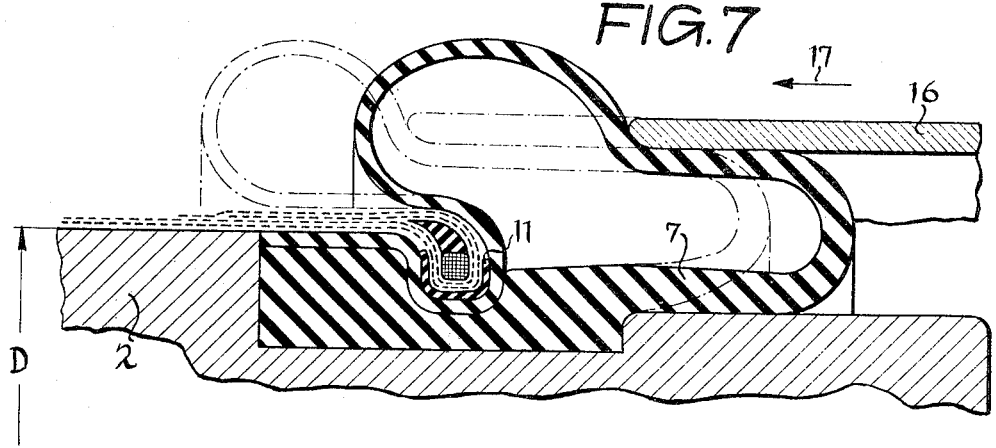

3,281,305
TIRE BUILDING DRUM VARIABLE IN DIAMETER
Heinrich Nädler, Hagen Kreis Neustadt am Rubenberge, and Hans Menell, Ahlem, Hannover, Germany, assignors to Continental Gummi-Werke Aktiengesellschaft, Hannover, Germany
Filed Dec. 10, 1962, Ser. No. 243,540
Claims priority, application Germany, Dec. 15, 1961,
C 25,744
8 Claims. (Cl. 156—401)

The present invention relates to a tire building drum built up of segments and variable in diameter. More specifically, the present invention relates to a tire building drum of the just mentioned type which has substantially cylindrical shape and near its two end faces is provided with inflatable bodies adapted by a rolling movement in axial direction of the drum to place the free wall portions of the carcass fabric or the like about bead cores.

With heretofore known tire building drums of the above mentioned type, the inflatable bodies are supported independently of the drum segments. More specifically, they are mounted on separate cylindrical bodies at both ends of the drum. Thus, separate supporting elements are required for the inflatable bodies.

In addition thereto, the inflatable bodies when carrying out their rolling or folding movement, have to overcome elevations caused by the increase in the diameter of the segmental drum in order to be able to complete the rolling movement. These tire building drums do not have circumferential grooves for receiving the tire beads. Instead the tire beads are arranged and mounted on the end faces of the segments which means laterally outwardly at both ends of the segments forming the drum.

It is, therefore, an ojbect of the present invention to provide an improved tire building drum of the above mentioned general type, which will materially facilitate the rolling and folding movement of the inflatable bodies.

It is a further object of this invention to provide an improved tire building drum composed of a plurality of segments and having inflatable means, which is considerably simpler in construction and operation than heretofore known tire building drums of the general type involved.

It is still another object of this invention to provide a tire building drum as set forth in the preceding paragraphs, which will make separate elements for the inflatable bodies superfluous.

A still further object of the present invention consists in so designing the segments making up the tire building drum and the inflatable bodies cooperating therewith that the segments and bodies positively engage each other.

It is also an object of the present invention to provide a tire building drum with a simplified arrangement of grooves for holding the bead cores.

These and other objects and advantages of the invention will appear more clearly from the following specification in connection with the accompanying drawings, in which:

FIGS. 3, 4 and 5 illustrate various phases of operation of the tire building drum according to the invention for folding carcass inserts or carcass fabric around the bead cores.

FIGS. 6 and 7 illustrate sections and operational phases of a modified arrangement according to the invention.

Figure 1:
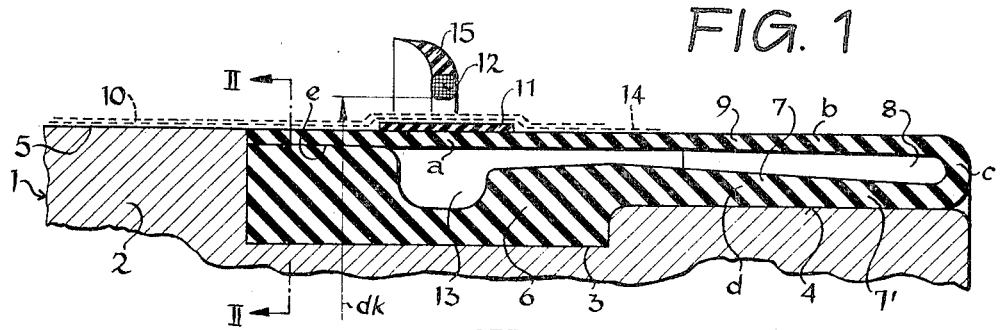
FIG. 1 is a partial longitudinal section through a tire building drum according to the invention.
Figure 2:
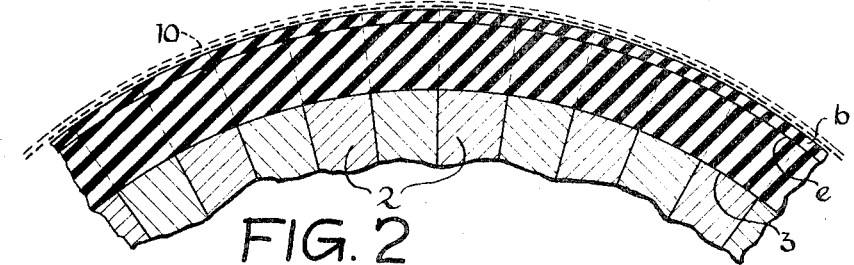
FIG. 2 represents a partial section taken along the line II—II of FIG. 1.
Figure 3:
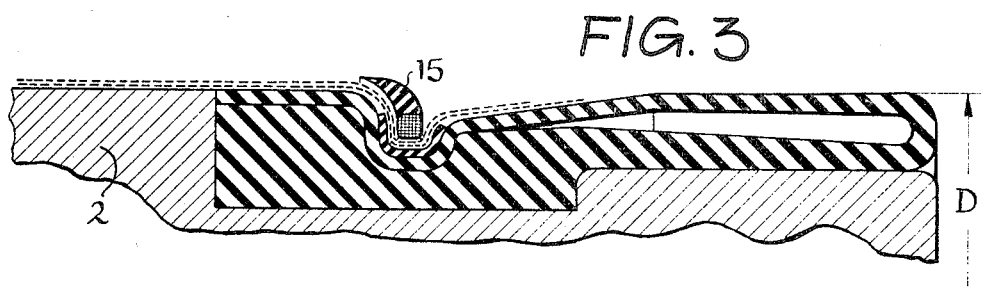

The tire building drum according to the invention which is provided with inflatable bodies for folding carcass inserts bead cores is characterized primarily in that the inflatable bodies are mounted on the segments forming the drum so as to extend around said segments and to follow the same when the drum diameter is being changed. In this way special supporting elements for the inflatable bodies become superfluous while the rolling or folding movement of the inflatable bodies can be carried out in a particularly simple manner due to the fact that the diameter of the inflatable bodies will always correspond to the diameter of the drum.

Referring now to the drawings in detail and FIGS. 1 to 5 thereof in particular, the arrangement illustrated therein comprises a tire building drum 1 having a plurality of segments 2 arranged in circumferential direction of the drum while extending radially inwardly of the drum. These segments may be actuated in a manner known per se as described for instance in U.S. Patent 2,743,760 so that the segments may be moved radially inwardly or outwardly with the result that the effective outer diameter of drum 1 will be increased or decreased respectively.

Near the outer periphery of the segments at the end portions of the drum the segments 2 are provided with circumferential recesses 3, while the two outermost ends of all segments 2 are formed by a surface 4 adjacent the respective recess 3. The surfaces 4 have a smaller diameter than the segmental surface 5 between the recesses 3. The recesses 3 of segments 2 form grooves extending over the entire circumference of the drum.

These grooves 3 are engaged by annular protrusions 6 of inflatable bodies 7 respectively arranged at each end portion of the segments extending therearound. These inflatable bodies may consist of any suitable yieldable elastic material, as for instance rubber. The wall portions of each inflatable body 7 confine a chamber 8 which latter through a connection, as for instance a valve, may be connected to a source of a pressure medium, as for instance compressed air. According to FIG. 1, the wall portion 9 of each inflatable body 7 is flush with the outer circumferential surface 5 when chamber 8 does not contain any or any material quantity of air under pressure.

When the drum 1 occupies the position according to FIG. 1, the tire fabric inserts 10 are first placed on the drum 1 and as the case may be also a bead protecting layer 11 is placed on the drum. Thereupon, the bead cores 12 are placed upon drum 1 so as to be coaxial therewith while being in radial alignment with a groove 13 provided in the protrusions 6 of the respective inflatable body 7. The free marginal portions of layers 10 which protrude beyond the bead cores 12 at both ends of drum 1 have been designated with the reference numeral 14.

The next step consists in enlarging the drum diameter by moving the segments 2 radially outwardly. Inasmuch as the inflatable bodies 7 extend around all segments 2, it will be evident that said inflatable bodies 7 will follow this increase in the diameter. During this operation, the bead cores 12 respectively enter the circumferential grooves 13 while the wall portions 9 and the portions of the fabric 10 surrounded thereby will deform in the manner illustrated in FIG. 3. It will be evident from the above that since the groove confining portions of the inflatable bodies 7 are elastically yieldable, during the increase in diameter of the drum and the entering of the bead cores into the respective circumferential groove 13 of the inflatable bodies 7, said bead cores will firmly and non-displaceably be pressed against the segments.

After the bead cores 12 have been provided with filling rubber strips 15 or the like, a pressure medium is introduced into chamber 8. As a result thereof, the marginal portions 14 of the fabric inserts are folded about the bead cores 12 as indicated in FIG. 5. The folding of the marginal portions 14 around the bead cores 12 may in conformity with FIGS. 4 and 5 be carried out solely by inflating the inflatable bodies 7 and by suitably dimensioning the cross sectional contour of the wall portions of the inflatable bodies in such a way that the wall portions 9' adjacent the fabric inserts 14 will without difficulties carry out the folding operation in the manner illustrated in FIGS. 4 and 5.

Figure 4:
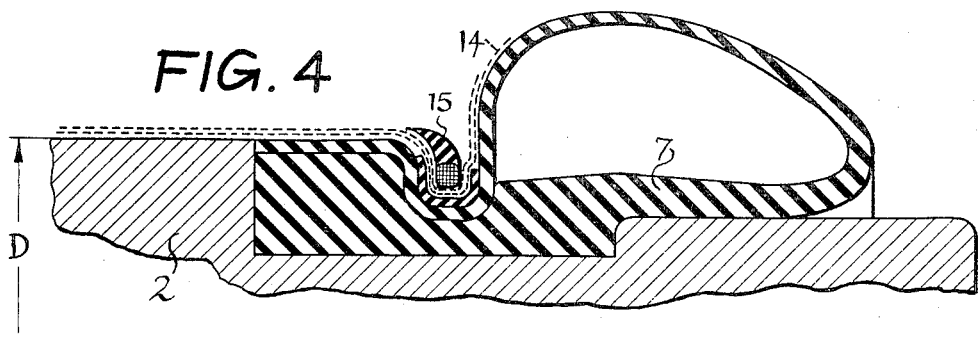

In order to obtain the desired deformation of the inflatable bodies 7 in conformity with the illustration of FIGS. 4 and 5, it is advantageous so to design the cross section of said inflatable bodies 7 that the inner wall portion 7' of said inflatable bodies decreases from the protrusion 6 toward the adjacent end face of the drum and that the outer wall portion 9 of the inflatable body decreases from the adjacent end face of the drum in the direction toward the location of the bead cores. In this way, the wall portion 7' will be less deformed than the wall portion 9. It is of particular importance that the wall portion 9 will be so designed that, as mentioned above, the thickness thereof near the respective adjacent end face of the drum is greater than that portion which is adjacent the respective bead core. The above mentioned folding effect will best be obtained when the wall thickness of wall portion 9 at $a$ will be less than the wall thickness at $b$, and the latter will, preferably gradually, become thicker in the direction toward the sections $c$ and $d$. Preferably, the wall thickness at $d$ is selected about three times the wall thickness at $a$.

The desired different deformability of the inflatable body may also be obtained by suitable inserts or by making the wall sections of the inflatable bodies of different elasticity and/or different hardness. Preferably, however, the cross sectional shape as illustrated in the drawing is to be selected.

For purposes of making the inflatable bodies 7, it is advantageous to employ a substantially hollow cylindrical rubber body which by folding over is formed into a hollow body while the ends of those portions which are folded together are firmly connected to each other by vulcanizing or the like.

If the carcass inserts 10 have their marginal portions 14 protrude beyond the bead cores over a considerable length during the build-up of the tire, it is advantageous in addition to the arrangement of FIGS. 1 to 5 to employ an auxiliary folding member, for instance in form of a hollow drum 16 coaxially arranged with regard to drum 1 and movable in axial direction thereof. As will be seen from FIGS. 6 and 7, an axial movement of auxiliary drum 16 in the direction of the arrow 17 will bring about a closer rolling and folding movement of the inflatable bodies around the respective adjacent bead cores 12.

It is, of course, to be understood that the present invention is, by no means, limited to the particular constructions shown in the drawings but also comprises any modifications within the scope of the appended claims.

What we claim is:

1. A tire building drum having a peripheral central cylindrical portion for mounting the fabric of a tire carcass and peripheral end portions of lesser diameter, and comprising a plurality of radially adjustable segments operable to vary the diameter of said drum, and resilient annular inflatable bodies over which said fabric extends, respectively arranged on the peripheral end portions of said drum and circumferentially surrounding and thereby embracing the end portions of said segments, each of said bodies at its inner end adjacent said central portion being of the same diameter to form an axial extension of said central portion, and having an inflatable portion at its outer end and an intermediate portion of lesser diameter than said central portion to receive the bead ring of a tire about which said fabric is folded by said inflatable wall portion.

2. A tire building drum which comprises a plurality of adjustable segments operable to vary the diameter of said drum, the periphery of said segments being provided with annular recess means spaced from each other in axial direction of said drum by a central cylindrical portion for mounting the fabric of a tire carcass, and a plurality of resilient annular inflatable bodies provided with annular protrusion means over which said fabric extends resting in said annular recess means and closely embracing said segments, said inflatable bodies resting on the periphery of said segments and circumferentially surrounding the same, each of said bodies at said annular protrusion means having a diameter equal to the diameter of said central cylindrical portion to form an extension of said portion and a groove to receive the bead ring of a tire, and an inflatable wall axially outward of said groove to bear on the fabric and fold said fabric over the bead ring when inflated.

3. An arrangement according to claim 2, in which said annular inflatable bodies have portions extending from said protrusion means in the axial direction toward the respective adjacent end faces of said drum.

4. A tire building drum having a peripheral central cylindrical portion for mounting the fabric of a tire carcass and comprising a plurality of radially adjustable segments operable to vary the diameter of said drum, and resilient annular inflatable bodies respectively arranged on the peripheral end portions of said drum and circumferentially surrounding and closely embracing said segments, each of said inflatable bodies having a circumferential outer wall portion and a circumferential inner wall portion, the circumferential inner wall portion of each of said inflatable bodies having that surface thereof which faces the circumferential outer wall portion provided with an annular groove each of said bodies axially inwardly of said groove having a diameter equal to the diameter of said central portion to form an axial extension of said portion.

5. A tire building drum which comprises a plurality of radially adjustable segments for varying the diameter of said drum, the periphery of said segments being provided with two annular depressions spaced from each other in the axial direction of said drum by a cylindrical portion on which the fabric of a tire carcass is mounted, and also spaced from the respective end faces of said drum, and two resilient annular inflatable bodies respectively arranged on the peripheral end portions of said drum and circumferentially surrounding the same, each of said inflatable bodies having a circumferential inner wall portion and a circumferential outer wall portion confining with said circumferential inner wall portion a chamber for receiving a fluid under pressure, said inner wall portion being provided with annular protrusion means engaging the respective adjacent annular depression, said protrusion means having that surface thereof which faces the circumferential outer wall portion provided with an annular groove and that portion of said resilient annular body axially inward of said groove being of the same diameter as said central cylindrical portion.

6. A tire building drum comprising a plurality of radially adjustable segments operable to vary the diameter of said drum, which comprises a pair of resilient annular inflatable bodies respectively arranged on the peripheral end portions of said drum and circumferentially surrounding and closely embracing said segments, each of said inflatable bodies having a circumferential inner wall portion and a circumferential outer wall portion confining with said inner wall portion a chamber adapted to receive fluid under pressure, the circumferential inner wall portion of each of said inflatable bodies having that surface thereof which faces the circumferential outer wall portion provided with an annular groove, the wall thickness of the outer wall portions of each of said inflatable bodies decreasing in a direction away from the respective adjacent end face of said drum, said bodies when deflated forming substantially an axial extension of the drum surface.

7. A tire building drum comprising a plurality of radially adjustable segments operable to vary the diameter of said drum, which comprises a pair of resilient annular bodies respectively arranged on the peripheral end portions of said drum and circumferentially surrounding and closely embracing said segments, each of said inflatable bodies having a circumferential inner wall portion and a circumferential outer wall portion confining with said inner wall portion a chamber adapted to receive fluid under pressure, the circumferential inner wall portion of each of said inflatable bodies having that surface thereof which faces the circumferential outer wall portion provided with an annular groove, the wall thickness of the inner wall portion of each of said inflatable bodies increasing in the direction away from the respective adjacent end face of said drum, said bodies when deflated forming substantially an axial extension of the drum surface.

8. The tire building drum as defined in claim 1, and means arranged axially outwardly from the end portions of said drum and movable axially toward said drum, the means at each end having an annular portion coaxial with the drum operable upon movement toward the drum for engaging said inflatable body at that end in inflatable condition to radially restrict the respective adjacent portion of the adjacent inflatable body for aiding in the folding action of the latter when folding fabric about the tire bead rings.

References Cited by the Examiner
UNITED STATES PATENTS

| | | | |
|---|---|---|---|
| 2,565,071 | 8/1951 | Frazier | 156—401 |
| 2,567,064 | 9/1951 | Frazier | 156—401 |
| 2,614,951 | 10/1952 | Iredell | 156—416 |
| 2,715,931 | 8/1955 | Frazier | 156—401 |
| 3,044,533 | 7/1962 | Lowe | 156—401 |
| 3,077,917 | 2/1963 | Appleby | 156—416 |
| 3,185,607 | 5/1965 | Nebout | 156—132 XR |

EARL M. BERGERT, *Primary Examiner.*

HAROLD ANSHER, ALEXANDER WYMAN,
*Examiners.*